B. B. GILBERT.
BOX COOKING KIT.
APPLICATION FILED JUNE 2, 1919.
1,330,862. Patented Feb. 17, 1920.
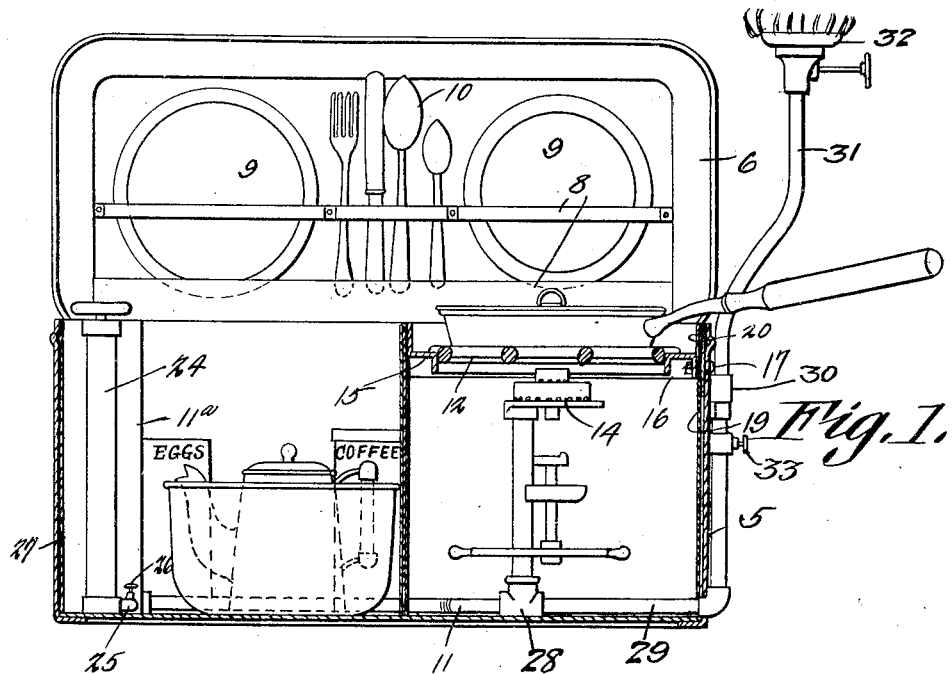
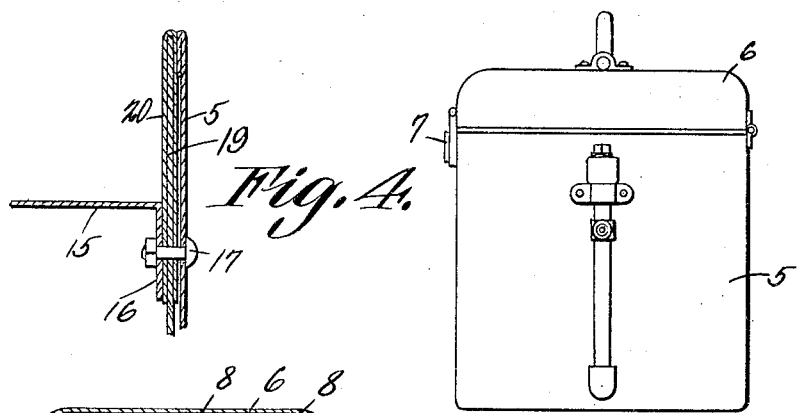
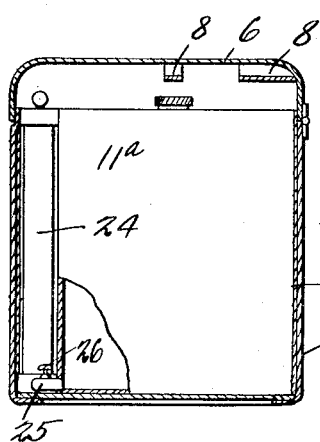
Inventor,
Battie B Gilbert,
By Hauks Ahhleman,
Attorney

UNITED STATES PATENT OFFICE.

BATTIE B. GILBERT, OF HUNTINGTON, WEST VIRGINIA, ASSIGNOR OF ONE-HALF TO WILLIAM J. FIELDS, OF OLIVE HILL, KENTUCKY.

BOX COOKING KIT.

1,330,862.  Specification of Letters Patent.  Patented Feb. 17, 1920.

Application filed June 2, 1919. Serial No. 301,216.

*To all whom it may concern:*

Be it known that I, BATTIE B. GILBERT, a citizen of the United States of America, and resident of Huntington, in the county of Cabell and State of West Virginia, have invented certain new and useful Improvements in Box Cooking Kits, of which the following is a specification.

This invention relates to stoves and particularly to summer or knock down stoves or kits and it has for its object the provision of novel means for supplying the wants or requirements of railway operators who are compelled to make long trips where facilities for the preparation of food are desirable and this is particularly true with respect to conductors and train operators who are working on long runs or trips, the said invention being also of great utility for motorists since the heating medium, culinary articles and table ware can be stored in compactly formed cases which can be secured to the foot board or other part of an automobile so that it may be carried conveniently.

The invention is also desirable for soldiers' use and for picnics, camping parties and other outings.

A further object of this invention is to provide a case with a heater associated therewith, the said heater being so insulated as to prevent damage to the case and the said insulation being protected from fouling which might occur from spattering grease or spilled food, the said invention also having provision for storing culinary articles as well as table articles so that a complete compact culinary equipment is supplied.

The present invention constitutes an improvement on the device forming the subject matter of my application, Serial Number 256,666 filed Oct. 3, 1918, in that the fuel tank and means for supplying fuel to the burner are contained within the receptacle, making it more compact than the device of the said application and also it has the advantage of obviating the setting up or dismantling of the fuel tank and the pipes for connecting the same to the burner.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a vertical sectional view of the receptacle with the cover open;

Fig. 2 illustrates an end view of the box containing the kit;

Fig. 3 illustrates a transverse sectional view at the end of the casing showing the fuel tank; and Fig. 4 illustrates a detail sectional view of the insulation and the protectors, and the parts associated therewith.

In these drawings 5 denotes a casing which is preferably a metallic box having a lid 6 hinged thereto and adapted to be held closed by a latch 7, which may be of any appropriate construction, the details of which are not shown.

The inner surface of the lid or cover 6 has retaining strips or elements 8 for holding articles such as plates 9 and other table ware, such as shown at 10, which may comprise knives, forks, spoons or other things.

The interior of the box or casing contains a stove or burner 14 of any appropriate construction, a well known construction being illustrated to show its applicability to the casing, but it is to be understood that applicant does not wish to be limited with respect to the type of the stove or burner employed.

As shown in the drawing, the heating arrangement is stationed as near one end of the casing as practicable so that the remainder of the casing may be utilized for holding pots, pans, bottles or the like, as well as provisions, as illustrated.

In connection with the fuel burner or stove, I provide a top or support for the stove, which top comprises an apertured sheet of metal 15 having a downwardly extending flange 16 at its edge which flange constitutes an anchorage for the fastenings 17 which may comprise bolts, rivets or the like.

A grid or apertured plate 12 is supported in the aperture of the top and is desirable for holding pans or kettles while the contents thereof are being heated or cooked.

To protect the casing from heat, an asbestos lining 19 is applied to the interior wall and the upper edge of the said asbestos lining is provided with a relatively deep binding 20 which embraces the edge of the asbestos lining and extends down between the flange 16 and the internal wall of the casing so that the binding is clamped in place by the fastenings which project through the flange and casing. The binding is preferably of metal and from the fact that it extends below the upper surface of the apertured plate, grease or food will not reach the insulation but will lodge on the plate and on the binding from whence it can be removed so that the device is sanitary and easily kept clean.

The burner is supplied with liquid fuel through a feed pipe 11 leading from a tank 11ª which is stationed at one end of the box, the said tank being intended to hold gasolene or other liquid fuel. In order to insure proper feeding of the fuel, an air pump 24 has a pipe 25 leading to the interior of the tank so that the said tank may be supplied with air under pressure of such degree as to insure proper feeding of the fuel and preferably the pipe 25 has a valve 26 which may be opened when the pump is operated and closed thereafter to prevent the escape of fuel.

Preferably, a packing 27 is provided at the ends and sides of the fuel receptacle, and the said packing may consist of fiber or sheets of asbestos may be employed to prevent movement of the fuel tank and to guard against vibration while the kit is being transported.

The supply pipe 11 leads to a coupling 28 with which the burner 14 is connected and the said coupling has an extension pipe 29 leading through the end wall of the casing and extending upwardly and terminating in a coupling 30. A length of piping 31 is detachably connected at the coupling 30 and it has at its outer end a torch or lighting burner 32 which can be used for illuminating purposes, deriving its fuel from the tank, the fuel of which is under pressure as has been explained.

A valve 33 controls the extension pipe 29 so that when it is closed, fuel cannot escape, and it is desirable to supply the end of the extension pipe 29 with a plug 34 to prevent foreign substances from gaining access to the pipe although this is an expedient which may be omitted if desired.

While I have referred to the heater or cooking burner in the singular, it is to be understood that a plurality of such burners may be contained within the casing without departing from the scope or spirit of the invention, it being understood that provision for protecting the casing may be extended in the proportion to the number of burners or heaters employed.

I claim—

1. A cooking kit comprising a casing adapted to receive a heating device, culinary articles and provisions, heating means therein, a pipe for furnishing fuel to the heating means, a fuel tank within the casing, a pipe leading from the said casing to the heating device, means for supplying pressure to the interior of the tank, an apertured plate having a depending flange at its outer edge, means for supporting the apertured plate above the heating medium, an insulated lining for the casing, a binding embracing the upper edge of the lining and extending down the sides thereof between the apertured plate and the casing, and fastening means through the said flange, insulated binding and casing for securing the parts in assembled relation.

2. A cooking kit comprising a casing adapted to receive a heating device, culinary articles and provisions, heating means therein, a pipe for furnishing fuel to the heating means, a fuel tank within the casing, a pipe leading from the said casing to the heating device, means for supplying pressure to the interior of the tank, an apertured plate having a depending flange at its outer edge, means for supporting the apertured plate above the heating medium, an insulated lining for the casing, a binding embracing the upper edge of the lining and extending down the sides thereof between the apertured plate and the casing, fastening means through the said flange, insulated binding and casing for securing the parts in assembled relation, an extension pipe in communication with the fuel pipe leading through the casing to the exterior thereof, a valve in said extension pipe, a pipe forming a continuation of the extension pipe with means for coupling it to the said extension pipe, and an illuminating burner on the pipe forming the continuation of the extension pipe.

BATTIE B. GILBERT.